Figure 1:
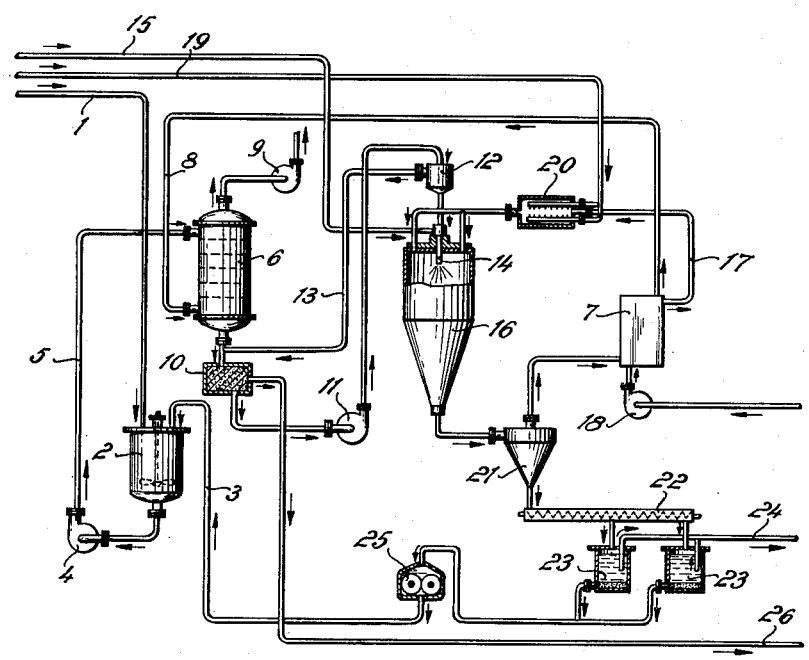

March 7, 1961  E. BAUER ET AL  2,974,093
PROCESS FOR THE MANUFACTURE OF SALT MIXTURES
FOR THE ELECTROLYTIC PRODUCTION OF MAGNESIUM
Filed Oct. 27, 1958  2 Sheets-Sheet 1

INVENTORS
ERICH BAUER
HANS EBERT
WILLI FORST
HANS PIEPER
BY
Connolly and Hutz
THEIR ATTORNEYS

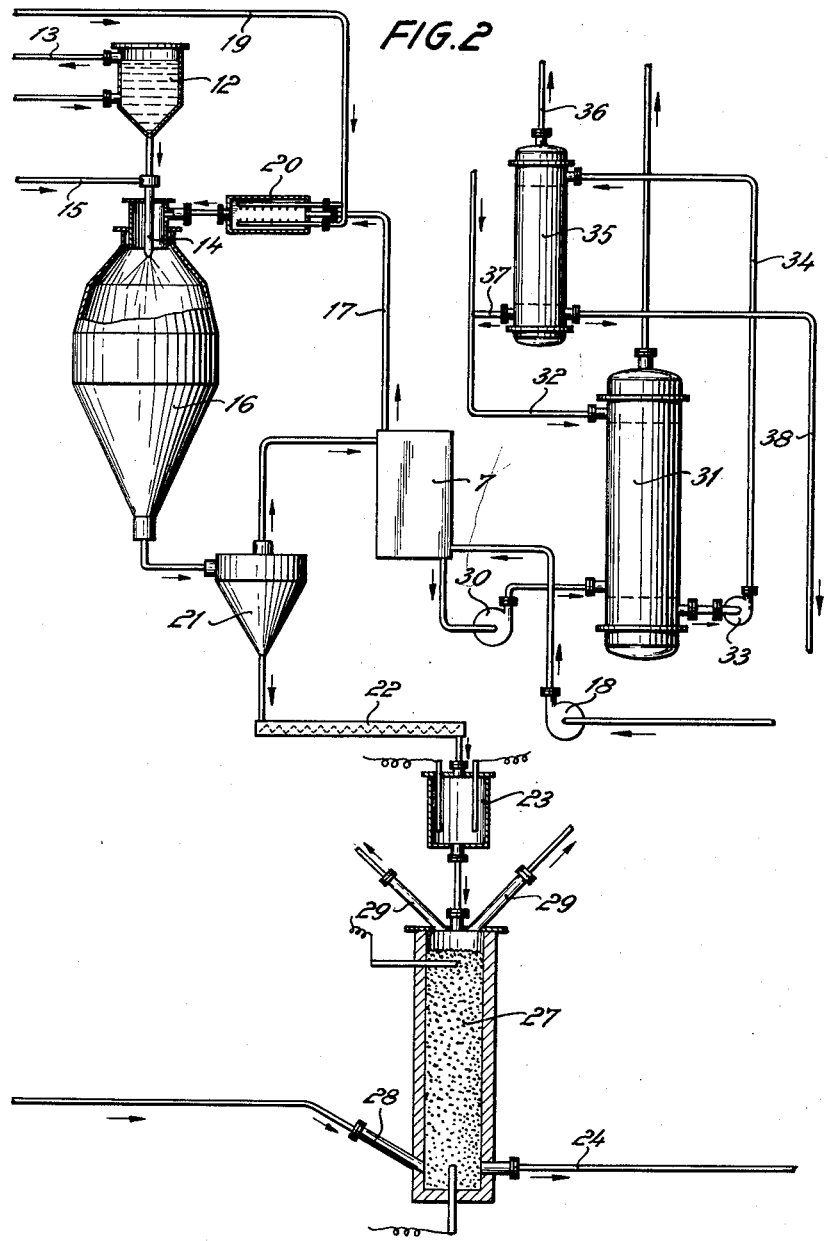

United States Patent Office 2,974,093
Patented Mar. 7, 1961

2,974,093

PROCESS FOR THE MANUFACTURE OF SALT MIXTURES FOR THE ELECTROLYTIC PRODUCTION OF MAGNESIUM

Erich Bauer, Frankfurt am Main, Hans Ebert and Willi Forst, Knapsack, near Koln, and Hans Pieper, Amberg, Oberpfalz, Germany, assignors to Knapsack-Griesheim Aktiengesellschaft, Knapsack, near Koln, Germany, a corporation of Germany Filed Oct. 27, 1958, Ser. No. 769,765

11 Claims. (Cl. 204—70)

The present invention relates to a process for the manufacture of salt mixtures capable of being used for the electrolytic production of magnesium.

The known processes for the manufacture of substantially anhydrous magnesium chloride very little oxide or of salt mixtures capable of being used for the electrolytic production of magnesium, generally comprise preparing a di- or monohydrate of magnesium chloride by dehydrating an aqueous solution which preferably contains magnesium chloride or a hydrate of magnesium chloride in several stages under mild conditions and partially under reduced pressure, and converting the di- or monohydrate so obtained into anhydrous magnesium chloride in a chlorine current in the presence of a reducing agent or in a current of hydrogen chloride at elevated temperatures.

According to other known methods, magnesium oxychloride is produced in a rather complicated manner and then treated with chlorine and carbon to yield anhydrous magnesium chloride.

All these processes are uneconomical since they consume large quantities of chlorine or hydrogen chloride and furthermore suffer from the difficulty of preventing corrosion.

In countries possessing cheap sources of energy, the mono- or dihydrate is melted directly and subjected to electrolysis, the yield of energy and material being small. These processes are unsatisfactory and uneconomical.

Electrolyzable magnesium chloride has hitherto been produced on an industrial scale according to the processes mentioned above. Other methods of preparing anhydrous magnesium chloride have also been proposed but have not gained importance in industry since they are too expensive.

The present invention provides a process for the manufacture of electrolyzable magnesium chloride poor in water and magnesium oxide and more particularly of salt mixtures of this kind containing magnesium chloride by atomization drying.

Several attempts were made to produce anhydrous magnesium chloride by atomization drying but the substances could only be dehyrated to yield mono- or dihydrates. As starting materials higher hydrates, particularly hexahydrate, $MgCl_2 \cdot 6H_2O$, were used. The resulting products contained 15 to 25% of $H_2O$ and 3 to 6% of MgO. When the products were further dehydrated by the application of elevated temperatures the content of magnesium oxide became too high.

We have found that products which have been dehydrated to a much higher extent, without the content of magnesium oxide in the product having been increased, can be obtained by raising not only the temperature but increasing simultaneously the amount of carrying air or, in other words, by reducing the partial steam pressure of the escaping gas, while taking care that the drops or particles are very small and can be very rapidly conveyed across the spraying chamber.

The commercial so-called magnesium chloride solutions do not constitute pure solutions of magnesium chloride in water but originate from the final liquors obtained in the potash industry or are obtained from sea water, magnesite or dolomite. All these solutions contain a small percentage of alkali metal halides or alkaline-earth metal halides and in most cases sulfate ions. To obtain a salt suitable for the electrolytic production of magnesium, the sulfate ions and bromide ions are to be removed, while a content of alkali and chloride has no detrimental effect but, on the contrary, favors dehydration.

It is known that carnallite or solutions in which the ratio of $KCl:MgCl_2$ corresponds to about the composition of carnallite can be more easily dehydrated, i.e. they necessitate a lesser degree of hydrolysis than pure magnesium chloride solutions. Even carnallite must, however, be dehydrated by a partial hydrolysis. Dehydrated carnallite contains about 3 to about 5% of water and about 1 to about 2% of magnesium oxide. We have found that magnesium chloride solutions having a considerably lower content of alkali metal chloride can be dehydrated by atomization drying to yield even better products.

By subjecting a final liquor obtained in the potash industry and containing, per liter, 350 grams of magnesium chloride, 8 grams of potassium chloride and 8 grams of sodium chloride to an atomization drying, a dehydrated product containing 5 to 6% of magnesium oxide and 2 to 3% of water is obtained, whereas a final liquor the content of potassium chloride of which has been increased and which contains, per liter, 350 grams of magnesium chloride, 25 grams of potassium chloride and 12 grams of sodium chloride yields a product containing 2 to 3% of magnesium oxide and 1 to 1.5% of water. A further increase of the content of potassium chloride has only an insignificant effect upon the analytical value of the final product.

The following methods of operation are described hereafter, without, however, limiting the application thereto; they are illustrated, by way of example, in the accompanying diagrammatic drawings:

*Example*

1000 liters of debrominated and desulfatized magnesium chloride liquor containing, per liter, about 350 grams of magnesium chloride, 12 grams of sodium chloride and 25 grams of potassium chloride and having a temperature of about +70 to +100° C. are introduced through conduit 1 shown in Fig. 1 of the drawings into mixing vessel 2 provided with a stirrer. Into this liquor about 60 to 80 kilograms of thin flakes of refluxed by-product consisting of magnesium oxide and magnesium chloride are introduced through conduit 3. The flakes which contain about 35% of magnesium oxide, 55% of magnesium chloride and 10% of alkali metal chlorides dissolve readily in the hot crude liquor, whereupon the magnesium oxide is transformed into magnesium hydroxide.

The resulting mash is pumped by liquor pump 4 through conduit 5 and enters the head of column 6. The mash trickles down in the column while escaping gases of a temperature of about +70 to about +150° C. which are not saturated with steam are introduced through conduit 8 from heat exchanger 7 and passed in countercurrent to the mash from the bottom to the top of the column. The escaping gases leave column 6 at a temperature of about +50 to about +80° C. and escape into the open air by way of fan 9 whereas the magnesium chloride solution which now contains, per liter, about 400 to 500 grams of magnesium chloride is pumped by pump 11 via filter 10 into overflow vessel 12 from where the overflowing portion returns through conduit 13 into the solution before filter 10.

From overflow vessel 12, the solution which has a temperature of about +70 to about +100° C. and contains, per liter, about 400 to 500 grams of magnesium chloride, 15 to 20 grams of sodium chloride and 30 to 40 grams of potassium chloride, proceeds to spraying nozzle 14 driven by compressed air from conduit 15 and enters atomizing tower 16. At the same time the atomizing tower 16 is supplied with hot fresh air which is introduced through conduit 17 after having been sucked-in by fan 18 and having been heated to a temperature of +400 to +600° C. in heat exchanger 7 and preheating chamber 20, the latter being heated with heating gas introduced through conduit 19.

On leaving the atomizing tower 16, the escaping gas has a temperature of about +300 to about +350° C. and contains about 7 to 12% by volume of steam.

From atomizing tower 16 the atomized material proceeds to cyclone 21 and is then transported by screw conveyor 22 to melting pots 23 which are electrically heated to about +800° C. In said melting pots the powder is melted and separated from the magnesium oxide by allowing the latter to deposit for some hours.

It has proved advantageous to compress the powder prior to the melting process in order to avoid formation of dust.

The anhydrous magnesium-chloride-containing salt melt accumulating at the top of pots 23 which contains only 0.1 to 0.5% of magnesium oxide is conveyed along transport way 24 in order to be subjected to electrolysis. The sludge which has deposited at the bottom of melting pots 23 and contains, for example, 35% of magnesium oxide, 55% of magnesium chloride and 10% of alkali metal chloride travels via flake roller 25 to mixing vessel 2.

The magnesium hydroxide separated from the solution by filter 10 leaves the process along transport way 26. It may be chlorinated or used otherwise.

The escaping gas leaving cyclone 21 passes through heat exchanger 7 and is then introduced at a temperature of about +70 to about +150° C. into column 6.

By proceeding in this manner, anhydrous products containing only 0.1 to 0.5% of magnesium oxide can be obtained in a yield of 90 to 95%.

It is immaterial whether natural or synthetic magnesium chloride solutions which may be of any desired concentration or hydrates of magnesium chloride are used as starting materials. It is furthermore unessential whether the air is not at all or only slightly preheated and blown through a flame together with the atomized product or whether only preheated air is used. The temperature at which the air is introduced is given, on the one hand, by the given steam content of the escaping gas and, on the other hand, by the water content of the solution to be atomized.

The magnesium chloride powder obtained which possesses the analytical values indicated above has a low bulk weight and is extremely hygroscopic owing to its small particle size. This small particle size enables the magnesium chloride particles to be very rapidly conveyed across the atomizing chamber, which presumably accounts for the fact that only a small quantity of magnesium oxide is formed in spite of the high degree of dehydration.

The magnesium chloride powder which has a temperature of about +300 to about +350° C. is separated in cyclone 21 and advantageously melted without coming into contact with the atmosphere. A part of the water evaporates during the melting operation, while another part promotes the hydrolysis of the magnesium chloride. The melt is substantially anhydrous at a temperature of about +800 to about +900° C. and contains about 5 to about 8% of magnesium oxide. Owing to its content of magnesium oxide, the melt is not yet electrolyzable. The magnesium oxide can be removed from the molten mass by being allowed to deposit as described above or by subjecting the whole melt containing about 5 to about 8% of magnesium oxide or only the sump which has deposited as described above and contains a high percentage of magnesium chloride, to a treatment with chlorine and carbon, chlorine and carbon monoxide, phosgene or hydrogen chloride.

When the salt melt containing 5 to 8% of magnesium oxide is further treated in a chlorinator, no liquor but recycled water is conducted in countercurrent to the gases escaping from the cyclone. During this procedure, the water grows steadily richer in magnesium chloride and hydrogen chloride. The resultant dilute acid containing magnesium chloride is then advantageously passed through a tower filled with magnesite, dolomite or limestone, whereby a magnesium chloride solution or a calcium chloride solution containing magnesium chloride is formed which can be used for the desulfatization of the crude liquor. The desired concentration of this liquor can be obtained by pumping.

Fig. 2 shows a form of this mode of proceeding. The numerals 7 and 12 to 24 designate the same devices as in Fig. 1.

The process is modified as follows:

The powder of the salt mixture which has been melted in melting pot 23 enters chlorinator 27 which is, for example, electrically heated and filled with carbon material and into which chlorine is introduced at the bottom through conduit 28 while gas containing carbon monoxide, carbon dioxide and hydrogen chloride escapes through conduits 29. During this procedure, the magnesium oxide is converted into magnesium chloride. The salt melt which is free from water and magnesium oxide is directly subjected to electrolysis.

Instead of the chlorinator which has been mentioned above by way of example, other devices may be used for carrying out the chlorination, for example a rotating cylindrical furnace.

Since, according to this mode of proceeding, no by-product is refluxed through conduit 3 into mixing vessel 2, the gases escaping from cyclone 21 which contain hydrogen chloride and fine dust of magnesium chloride can no longer be conducted through conduit 8 into column 6.

The following mode of proceeding may be applied instead:

The gases escaping from cyclone 21 and containing hydrogen chloride and fine dust of magnesium chloride are passed through heat exchanger 7 and fan 30 and enter absorption tower 31 which, if desired, may be filled with Raschig rings and which is sprayed with water supplied through conduit 32. In said absorption tower 31, an acid salt solution containing magnesium chloride is formed from the escaping gas containing hydrogen chloride and fine dust of magnesium chloride. The acid salt solution is then pumped by pump 33 through conduit 34 into neutralization tower 35 charged with limestone, dolomite or magnesite. In this tower, the acid salt solution is neutralized and the hydrogen chloride converted to magnesium chloride or calcium chloride, while the carbon dioxide which has been set free escapes through conduit 36.

The neutral salt solution leaving neutralization tower 35 by way of conduit 37 flows into conduit 32 so that the solution travelling through absorption tower 31 and neutralization tower 35 is conducted in a cycle.

Since the solution becomes steadily richer in dissolved substances, a part of the recycled solution is suitably removed through conduit 38 and advantageously used for the desulfatization, the amount of water supplied to conduit 32 being adjusted accordingly.

The process of the invention provides a simple method of producing anhydrous electrolyzable magnesium chloride containing but little magnesium oxide from magnesium-chloride-containing salt solutions of any desired concentration.

The steam content of the escaping gas which amounts to about 7 to about 12% by volume requires large quantities of air which are introduced into the process at a temperature of about +400 to about +600° C. and leave it at a temperature of +300 to +350° C. It is therefore necessary that the energy of the escaping gas which contains, in addition to stored heat, fine dust of magnesium chloride which has not been separated in cyclone 21 and highly diluted hydrogen chloride originating from the hydrolysis, be utilized in accordance with the invention.

Contacting the escaping gases in column 6 with the mash prepared in mixing vessel 2 offers the following advantages:

(a) The heat exchange between gas and liquid is very good so that a further concentration of the liquor takes place. The fresh air sucked-in by fan 18 is heated in heat exchanger 7 and preheating chamber 20 to about +400 to about +600° C. and leaves the process by way of fan 9 at a temperature of about +50 to about +80° C.

If the admission temperature of the fresh air is +20° C., the loss in energy produced by the escaping gas amounts to only about 8 to 10% of the total energy introduced.

(b) The magnesium chloride which has not been separated in cyclone 21 enters column 6 in the form of fine dust and is dissolved by the liquid trickling down.

(c) The hydrogen chloride contained in the escaping gas is absorbed by the liquor in column 6 and reacts with the suspended magnesium hydroxide to yield magnesium chloride. The mash emerging from mixing vessel 2 contains a somewhat larger quantity of magnesium hydroxide than corresponds to the content of hydrogen chloride in the escaping gas. The excess amount of magnesium hydroxide is equivalent to the amount of hydrogen chloride evolved during the melting of the magnesium chloride powder in melting pots 23. The magnesium hydroxide still contained in the concentrated liquor is separated therefrom in filter 10.

It is also possible to proceed in a manner such that hydrogen chloride is added to the escaping gas in a quantity corresponding to the content of magnesium hydroxide. Alternatively, the melting pots 23 may be covered and the hydrogen chloride evolved during the melting may be pressed into the current of escaping gas. In this case, filter 10 may be dispensed with and the concentrated liquor may be pumped direct from column 6 into overflow vessel 12 by pump 11 in order to be fed to spray nozzle 14.

The process of the invention for the manufacture of salt mixtures containing magnesium chloride and only a small amount of water and magnesium oxide and which are capable of being used for the electrolytic production of magnesium, by subjecting aqueous magnesium-chloride-containing salt mixtures of any desired concentration to an atomization drying, thus comprises making the refluxed by-product containing magnesium oxide and magnesium chloride into a mash with the starting solutions, concentrating the mash in a column with the gases escaping from the atomization dryer, which gases have a temperature of about +70 to about +150° C. and are not saturated with steam, in a manner such that the escaping gas leaves the column at a temperature of about +50 to about +80° C., separating the concentrated salt solution from the undissolved magnesium hydroxide, atomizing the separated salt solution in an atomization tower by means of compressed air, while simultaneously introducing fresh air having a temperature of about +400 to about +600° C., so that a dry powder is obtained, the temperature of the gas escaping from the atomizing tower amounting to about +300 to about +350° C., and the steam content of the escaping gas being about 7 to 12% by volume, melting the resultant salt mixture which has been separated for example in a cyclone or filtering device and which still contains 2 to 3% of magnesium oxide and 1 to 2% of water, without bringing it into contact with the atmosphere, allowing the magnesium oxide to deposit, removing the overlying salt melt which contains 0.1 to 0.5% of magnesium oxide in order to subject it to electrolysis, making the salt-containing magnesium oxide, which has deposited, once more into a mash, using the heat of the gas escaping from the atomization tower for preheating the fresh air, and binding the hydrogen chloride and the fine dust of magnesium chloride contained in the escaping gases in the column with a salt solution containing magnesium hydroxide and magnesium chloride.

In another form of the process of the invention, the solid substances of the starting solution contain up to 20%, for example 10%, of alkali metal chlorides, especially potassium chloride.

It is also possible to treat the salt mixture which has been separated in the cyclone or filtering device, in the solid or liquid state for example with chlorine and carbon, chlorine and carbon monoxide, phosgene or hydrogen chloride, in order to convert the magnesium oxide into magnesium chloride.

Alternatively, the sump which has been separated from the melt of the salt mixture by depositing and which consists mainly of magnesium oxide and magnesium chloride, is treated with chlorine and carbon, chlorine and carbon monoxide, phosgene or hydrogen chloride.

According to another conception of the present invention, the fine dust of magnesium chloride and the hydrogen chloride contained in the gases leaving the atomizing dryer are absorbed in a column by means of water. The resulting acid solution is passed through a tower filled with limestone, dolomite or magnesite, whereby a neutral salt solution containing magnesium chloride and calcium chloride is formed.

In a further method according to the invention the neutral salt solution containing magnesium chloride and calcium chloride is recycled.

We claim:

1. The process for producing electrolyzable substantially anhydrous magnesium chloride having a magnesium oxide content of 0.1 to 0.5% comprising the steps of atomizing a concentrated mash comprising magnesium chloride solution in an atomizing tower by means of compressed air to yield a dry powder, introducing into the tower fresh air having a temperature of about 400–600° C. during the atomizing step, collecting gas escaping from the atomization tower, said gas having a temperature of about 300 to about 350° C. and a steam content of about 7 to about 12% by volume, using the heated gases escaping during the atomization for preheating the fresh air, collecting the resultant separated dry powder salt mixture, said mixture containing about 2 to about 3% by weight of magnesium oxide and about 1 to about 2% by weight of water, melting said resultant separated salt mixture without bringing it into contact with the atmosphere, permitting salt-containing magnesium oxide separated during the melting step to deposit, withdrawing the overlying substantially anhydrous salt melt, directly transferring the melt to an electrolysis station, withdrawing the salt-containing magnesium oxide which has deposited, mixing said salt-containing magnesium oxide with a starting solution of magnesium chloride containing salt solution to form the mash introduced into the atomizing tower, concentrating the mash in a column with the gases escaping from the atomizing tower which gases have cooled through said heating of the fresh air to a temperature of about 70–150° C. and are not saturated with steam to such an extent that the gas leaves the column at a temperature of about 50–80° C., separating the concentrated salt solution from undissolved magnesium hydroxide, and binding the hydrogen chloride and the fine dust of magnesium chloride contained in the escaping gases from the concentration column with a salt solution containing magnesium hydroxide and magnesium chloride.

2. The process according to claim 1 wherein a starting solution is used in which the solid substances thereof contain up to about 20% by weight of alkali metal chlorides.

3. The process according to claim 2 wherein a starting solution is used in which the solid substances thereof contain about 10% by weight of alkali metal chlorides.

4. The process according to claim 2 wherein a starting solution is used in which the alkali metal chloride portion thereof consists of potassium chloride.

5. The process according to claim 1 wherein the salt mixture issuing from the atomizing tower is separated in a cyclone.

6. The process according to claim 1 wherein the salt mixture issuing from the concentrating column is separated in a filtering device.

7. The process according to claim 1 wherein the separated salt mixture is treated in the solid state with at least one group of substances selected from the groups consisting of chlorine with carbon monoxide, phosgene, and hydrogen chloride, in order to convert the magnesium oxide into magnesium chloride.

8. The process according to claim 1 wherein the separated salt mixture is treated in the liquid state with at least one group of substances selected from the groups consisting of chlorine with carbon monoxide, phosgene, and hydrogen chloride, in order to convert the magnesium oxide into magnesium chloride.

9. The process according to claim 1 wherein the sump deposited from the melt of the salt mixture and consisting substantially of magnesium oxide and magnesium chloride, is treated with at least one group of substances selected from the groups consisting of chlorine with carbon monoxide, phosgene, and hydrogen chloride.

10. The process according to claim 1 wherein the fine dust of magnesium chloride and the hydrogen chloride contained in the gases escaping during the atomization drying are absorbed in a column by means of water, and the resultant acid solution is passed through a tower charged with at least one substance selected from the group consisting of limestone, dolomite and magnesite, whereby a neutral salt solution containing magnesium chloride and calcium chloride is formed.

11. The process according to claim 10 wherein the neutral salt solution containing magnesium chloride and calcium chloride is recycled.

References Cited in the file of this patent
UNITED STATES PATENTS

| | | |
|---|---|---|
| 1,800,589 | Barstow et al. | Apr. 14, 1931 |
| 1,951,494 | Staib et al. | Mar. 20, 1934 |
| 2,398,493 | Butt et al. | Apr. 16, 1946 |
| 2,418,408 | Heath et al. | Apr. 1, 1947 |

FOREIGN PATENTS

| | | |
|---|---|---|
| 397,481 | Great Britain | Aug. 22, 1933 |
| 555,734 | Great Britain | Sept. 6, 1943 |

OTHER REFERENCES

Perry: Chemical Engineer's Handbook, 3rd edition, 1950, pp. 838–846.

UNITED STATES PATENT OFFICE
CERTIFICATION OF CORRECTION

Patent No. 2,974,093            March 7, 1961

Erich Bauer et al.

It is hereby certified that error appears in the above numbered patent requiring correction and that the said Letters Patent should read as corrected below.

Column 1, line 20, after "chloride" insert -- containing --.

Signed and sealed this 29th day of August 1961.

(SEAL)
Attest:

ERNEST W. SWIDER
Attesting Officer

DAVID L. LADD
Commissioner of Patents